Nov. 13, 1934.  W. E. STINE  1,980,447
ARC WELDING APPARATUS
Filed April 14, 1931

INVENTOR.
Wilmer E. Stine
BY
Fay, Oberlin & Fay
ATTORNEYS.

Patented Nov. 13, 1934

1,980,447

UNITED STATES PATENT OFFICE 1,980,447

ARC WELDING APPARATUS

Wilmer E. Stine, Cleveland, Ohio, assignor to The Lincoln Electric Company, Cleveland, Ohio, a corporation of Ohio Application April 14, 1931, Serial No. 529,999

8 Claims. (Cl. 219—8)

This invention, relating as indicated to a method of arc-welding and apparatus for carrying forth such method, has particular reference to a form of construction of means associated with the electrode adapted to be presented in arcing relation to the work whereby results may be achieved which have heretofore never been realized.

More specifically, my invention contemplates the provision of means associated with the means for supporting the welding electrode in arcing relation to the work and for leading the welding current from such electrode.

It is among the objects of my invention to provide a method of and apparatus for electric arc welding which may be advantageously employed for the purpose of maintaining the proper magnetic conditions in the vicinity of the welding arc and thereby controlling the operation of such arc. Other objects of my invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
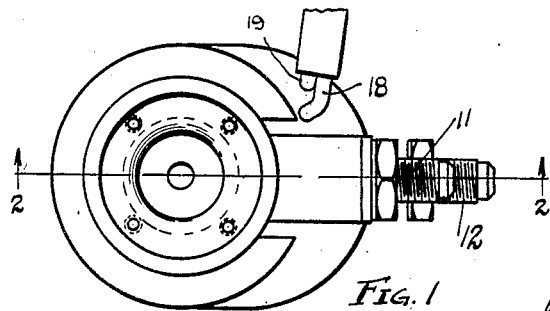
Figure 3:
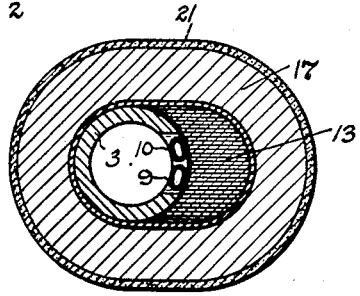
Figure 2:
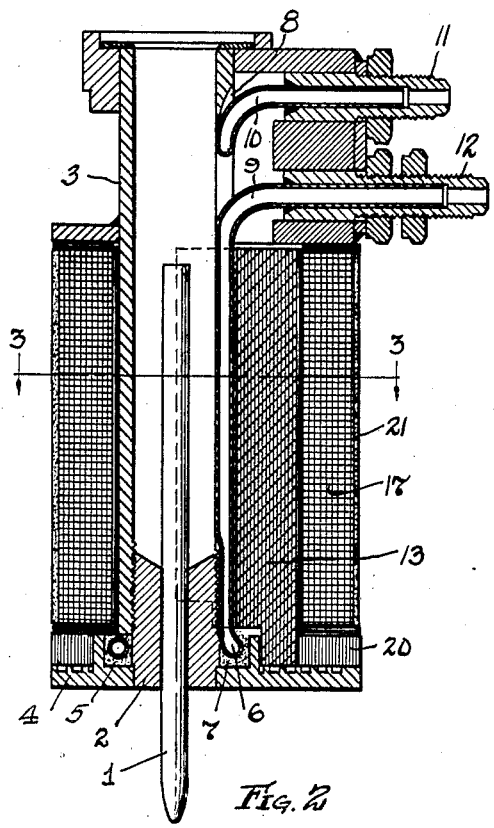
Figure 4:
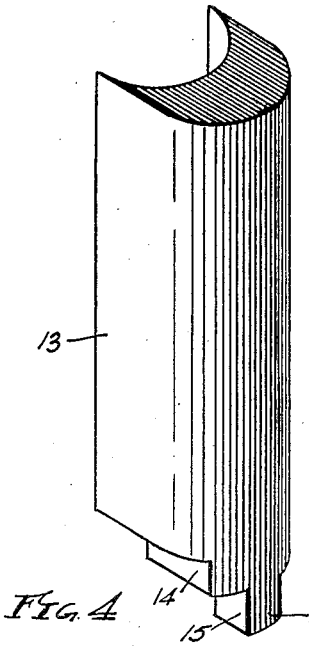

In said annexed drawing:

Fig. 1 is a plan view of the apparatus comprising my invention. Fig. 2 is a sectional view of the apparatus illustrated in Fig. 1 taken on a plane substantially indicated by the line 2—2. Fig. 3 is a transverse sectional view of the apparatus illustrated in the previous figures taken on a plane substantially indicated by the line 3—3 in Fig. 2; and Fig. 4 is a perspective view of one element of the apparatus which is illustrated assembled in the previous figures.

Referring more specifically to the drawing and more especially to Fig. 2, the apparatus comprising my invention is shown supporting a welding electrode 1 which, by means of such apparatus, will be presented in arcing relation to the work not shown. The welding electrode 1 in the particular form of construction illustrated is a non-melting electrode made of material such as carbon although it is to be understood that such electrode may be fusible, such as an iron pencil, in carrying forth the principles comprising my invention.

The electrode 1 is telescopically engaged and supported by a bushing 2, which is threadably engaged by the inner periphery of a tubular shell 3, which extends substantially throughout the entire length of the apparatus. The bushing 2 has a shoe plate 4 secured thereto, the general outline of which is most clearly illustrated in Fig. 3, a cross-section being shown in Fig. 2. The shoe or plate 4 is preferably of a material having high electrical resistance in order to reduce eddy currents to a minimum as hereinafter more fully explained.

The shoe or sole plate 4 has an annular groove 5 formed therein in which is positioned a hollow tube 6 of thermal and electrical conductivity, such tube being embedded in suitable brazing material 7. The tube 6 has the terminals thereof extending axially of the apparatus in a slot 8 formed therefor in the wall of the tubular member 3. The conduits 9 and 10 leading from the tube will preferably be of copper or like material having thermal, as well as electrical conductivity so that the current to the electrode may be supplied by such conductors. These conductors, however, also carry a temperature modifying medium such as water whereby the bushing 2 in engagement with the heated electrode may be kept at a suitable working temperature. Nipples 11 and 12 may be associated with the tubes 9 and 10 so as to provide means for connecting further supply conduits thereto.

Positioned adjacent the tubular shell 3 and embracing substantially one-half of its outer periphery is an element 13 which is most clearly illustrated in Fig. 4. This element is preferably formed of a plurality of laminations extending axially of the tube 3 and the lower end of the element 13 is relieved as at 14 and 15 so as to provide an axially extending terminal portion 16 for the purposes hereinafter more fully explained.

With the member 13 positioned on the outer periphery of the tubular member 3, a coil 17 is positioned around the assembly which coil may have the usual leads 18 and 19 extending therefrom by means of which, current for energizing such coil may be carried thereto and therefrom. Insulating material such as 20 may be interposed between the coil and the shoe 4 in order to prevent deterioration of the windings in the coil and an insulating sleeve 21 may encompass the coil to further protect the same.

The hereinbefore described apparatus which is designed to carry forth the method comprising my invention may be employed in two distinct fashions, that is, by having the coil 17 energized by alternating or pulsating electric current or energizing such coil by means of direct current. The operation of the apparatus when employing alternating or pulsating current will first be described.

If the coil 17 carries alternating current, the magnetic field created thereby will produce eddy currents in the steel tube 3 and due to the fact that such tube is paralleled by the laminated iron core 13, and further, due to the fact that such core has a much greater effective permeance than the steel tube, the flux density in the laminated iron will be much greater than the flux density in the steel tube. Due to the fact that the lower end of the laminated iron core 13 has been cut away to provide an axially extending tip 16, there will be a concentration of flux at the tip of the laminated section and a very weak field at the end of the steel tube. If the tip of the laminated section is to the rear of the arc as the same moves along the seam, it will be over the pool of molten metal produced by the arc and such arc will be blown forwardly into the cold area. The establishment and maintenance of this transverse magnetic field will, therefore, create an agitation of the molten metal in the pool which is very desirable for the production of good welded seams. The slight magnetic field in the circular steel tube 3 around the electrode will, however, be sufficient to maintain the arc stable within the desired bounds of its operation.

As hereinbefore indicated, the apparatus comprising my invention may be employed to carry forth the method thereof by having the coil 17 energized by direct current instead of alternating or pulsating current as hereinbefore described. When the coil is carrying direct current, there will be no eddy current effect and therefore the magnetic field will be more uniformly distributed around the arc but due to the shape and cross section of the tip of the laminated core, there will be a stronger magnetic field at this tip and therefore, if the tip is placed on the trailing side of the arc, the arc will be blown slightly forward into the cold metal, and the molten metal under the arc will receive a maximum of agitation due to the electromagnetic effect as above described. When a uni-directional magnetic field is established by having the coil 17 energized by direct current, the molten metal in the pool will be given a whirling or circular motion in a direction depending upon the direction of current flow in the coil. By reversing such direction of current flow, the direction of motion of the molten metal can also be changed. This ability to reverse the direction of the current through the field with the resultant change in its effect on the metal, may be employed advantageously when making lap welds, that is, the direction of motion of the molten metal will be varied according to the direction in which the lap occurs. When direct current is employed for the purpose of energizing the coil 17, the core 13 may be made as a solid iron block instead of the laminated construction illustrated in the drawing.

When the coil around the electrode is energized by alternating or pulsating current, the relative flux densities in the solid tubular member 3 and the laminated core 13 may be varied by varying the frequency of the current in such coil 17, that is, the laminated core will have a greater effective permeance than the solid tubular member as the frequency of the current in the coil is increased, so that a varying control may be had over the welding arc by changing the frequency of the current in the coil, and further, variable control of the welding arc may be effected by changing the voltage impressed on the coil whether it carries alternating or direct current.

As previously indicated, the shoe or plate 4 is preferably formed of a material having relatively high electrical resistance in order to reduce eddy currents, particularly when alternating current is employed to establish the arc-controlling magnetic field. The elimination of eddy currents in the end of the core adjacent the arc is essential for the proper maintenance of an arc-controlling magnetic field. If the eddy currents are not eliminated or reduced to a large extent, they will have around them additional magnetic fields which disturb and generally render ineffective the main field which is established for the purpose of controlling the arc.

In the light of the above, it is believed that a further description of the principles comprising my invention need not be given for those familiar with the art. Suffice it to say that numerous advantages result from the employment of the method and apparatus hereinbefore described which have not been enumerated but which will be found to result from the employment of the principles comprising my invention.

Other modes of applying the principles of my invention may be employed instead of the one explained, change being made as regards the mechanism herein disclosed, provided the means stated by any of the following claims or the equivalent of such stated means be employed.

I therefore particularly point out and distinctly claim as my invention:

1. In electric arc welding apparatus, the combination of electrode gripping and supporting means, and means formed of magnetic material disposed around said electrode and having a thickened axially extending portion.

2. In electric arc welding apparatus, the combination of electrode gripping and supporting means, a tubular shell of magnetic material around said electrode, and a core of magnetic material extending axially of said shell adjacent one side thereof.

3. In electric arc welding apparatus, the combination of electrode gripping and supporting means, an electro-magnet coil around said electrode, and a second core of laminated magnetic material associated with said first named core but extending only partially around said electrode.

4. In electric arc welding apparatus, the combination of electrode gripping and supporting means, an electro-magnet coil around said electrode, and a core of magnetic material within said coil and extending only partially around said electrode.

5. In electric arc welding apparatus, the combination of electrode gripping and supporting means, an electro-magnet coil around said electrode, and a core of magnetic material arranged so that its cross-section is unsymmetrical about the axis of the electrode.

6. In electric arc welding apparatus, the combination of electrode gripping and supporting means, an electro-magnet coil around said electrode, and a core of magnetic material within said coil and radially thickened adjacent the rear side of the operating end of the electrode.

7. In electric arc welding apparatus, the combination of electrode gripping and supporting means, an electro-magnet coil around said electrode, a core of magnetic material within said coil and provided with an extending point adjacent the operating end of said electrode.

8. In electric arc welding apparatus, the combination of electrode gripping and supporting means, an electro-magnet coil around said electrode, a core of magnetic material within said coil, and means shielding said core and coil from the arc comprising a metallic plate of high electrical resistance positioned around the electrode and across the ends of said core and coil adjacent the operating end of the electrode.

WILMER E. STINE.